April 3, 1928.
E. ISBELL
1,664,511
INFORMATION DISPLAY DEVICE
Filed March 9, 1927
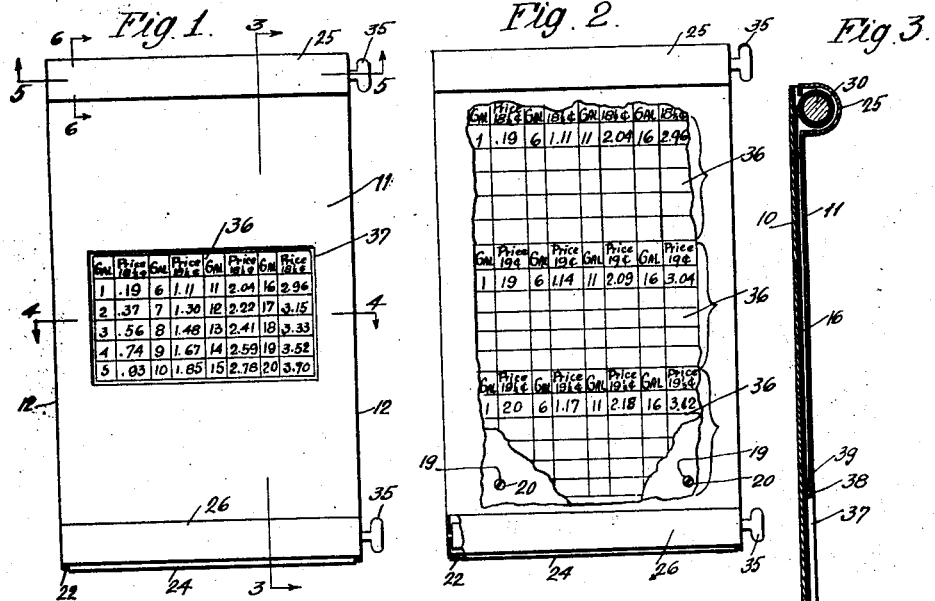
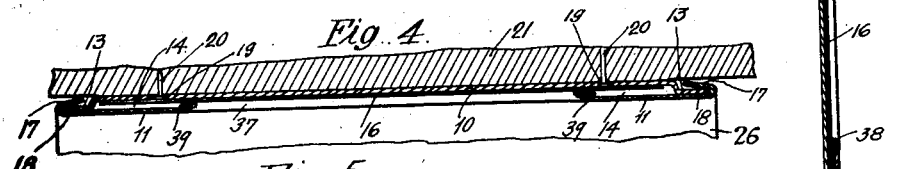
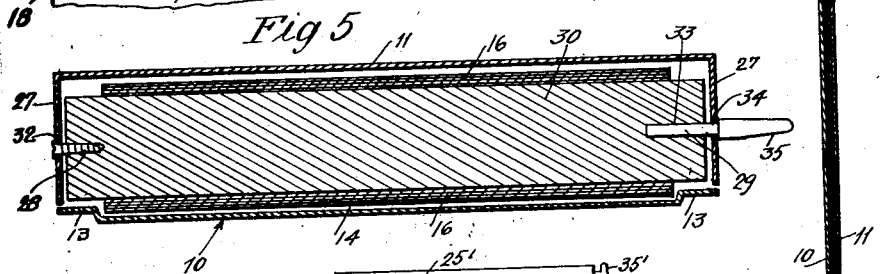
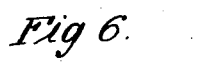
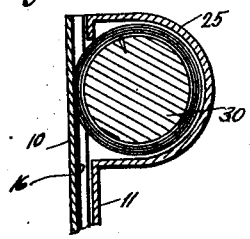
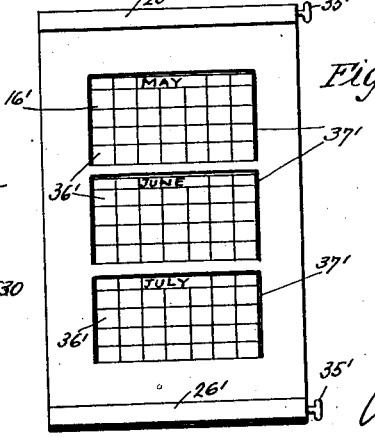
Inventor.
Elton Isbell
Attorney.

Patented Apr. 3, 1928.

1,664,511

UNITED STATES PATENT OFFICE.

ELTON ISBELL, OF LOS ANGELES, CALIFORNIA.

INFORMATION DISPLAY DEVICE.

Application filed March 9, 1927. Serial No. 174,044.

This invention relates generally to devices for displaying information which varies from time to time as to subject matter. For instance, I have shown the device as adapted to the use of the operators and customers of gasolene service stations. In this instance, the data-carrying tape or band of the device is provided with a plurality of tables or charts, each giving the price of a predetermined number of gallons of gasolene at different given rates per gallon. Only one chart is visible at a time, this chart of course being one which indicates the cost of different quantities of gasolene at the prevailing price. When the prevailing unit-price changes, the data-tape is shifted in a manner to bring a corresponding chart into view. It is thus made possible for operator and customer to arrive at the cost of a given number of gallons of fuel without computation, the advantage of this being self-evident.

Another example of advantageous embodiment is in the application of monthly calendars to the data-tape. For instance, there may be three sight openings in the device to give visibility to three month calendars: the instant, immediately preceeding and immediately following, month. At the beginning of a new month, the band is merely shifted to expose the proper month calendars.

It is among the principal objects of my invention to provide a device of the character described above which may be made up simply and easily and at comparatively small cost, and yet be attractive in appearance and easy and sure of operation. The housing portion of the device may be made up wholly of sheet metal, and may be formed by simple punching and pressing operations. Yet the fabrication is such that the device is not only compact, light and neat in appearance, but it has such structural characteristics that it is adapted to stand up even though it be exposed to the weather and to a certain amount of abuse which is to be expected where installations are out-of-doors.

The details of construction may be discussed to better advantage in the following specification, wherein further objects and features of novelty will be made apparent. Reference will be had to the accompanying drawings, in which:

Fig. 1 is an elevation of a device embodying my invention;

Fig. 2 is a view similar to Fig. 1, but showing a portion of the cover plate broken away;

Fig. 3 is an enlarged section on line 3—3 of Fig. 1;

Fig. 4 is an enlarged section on line 4—4 of Fig. 1;

Fig. 5 is an enlarged section on line 5—5 of Fig. 1; and

Fig. 6 is an enlarged, fragmentary section on line 6—6 of Fig. 1;

Fig. 7 is a modification showing the adaptation of the device to another situation.

The device may be considered as including a housing made up of a support plate 10 and a cover plate 11, the plates being spaced apart slightly intermediate their side edges 12. The plates 10 and 11 are adapted to be moved into overlapping relation or into operative assembly by relative sliding movement in the direction of their length. To guide them in this sliding movement and then to hold them against lateral separative movement, I provide on supporting plate 10 the offset edges or lips 13, which lips extend the full length thereof and form, in effect, a central channel 14, which extends longitudinally of the plate. The off-setting of lips 13 also spaces cover plate 11 a predetermined distance from plate 10, this distance being such that the data-carrying tape 16, to be described later, may pass freely between the plates.

The side edges of cover plate 11 are turned over at 17 to provide ways 18 for taking lips 13, the coaction of the lips and ways permitting relative sliding movement between the plates but preventing their lateral displacement.

When the device is to be set up, or when occasion arises for renewing or inspecting the data-band or its shifting mechanism, the cover plate is slid upwardly (as viewed in Fig. 1) and, if necessary, off the supporting plate. This exposes the apertures 19 in supporting plate 10, allowing screws or nails 20 to be passed therethrough from the front side of said plate into any suitable backing or support 21.

When the cover plate is again slid into overlapping relation with the supporting plate, the lower edge 22 of the cover plate is adapted to engage the upwardly facing shoulder 23 provided along the lower edge of the supporting plate by the turned over flange 24, this co-action, of course, limiting the downward movement of the cover plate. Flange 24 additionally protects the lower edge of said plate, as well as assisting in holding the two plates against relative lateral separative movement.

A particular feature of my invention resides in the fact that the data-tape and its shifting means are carried entirely by the cover plate, so, when the latter is detached from the supporting plate, the band and its supporting mechanism are entirely exposed, this mounting also greatly simplifying the structural characteristics and reducing manufacturing costs.

The ends of cover plate 10 are bent upwardly and over to provide roller housings 25 and 26, these housing being closed at their ends by caps or end plates 27. Since the rollers and their mountings may be identical, I will describe only one set in detail. End plates 27 support for rotation the coaxial shafts 28 and 29, provided at the opposite ends of each roller 30, 31, said rollers being housed within housing 25, 26, respectively. Shaft 28 may be in the form of a screw threaded into one end of the roller and having bearing in one plate 27 at 32. Shaft 29 may have tight fit within the roller bore 33, or be otherwise suitably fastened thereto, and has rotational bearing in its associated end plate at 34. Shaft 29 carries knob or fingergrip 35 whereby the roller is adapted to be rotated.

Data-band 16 is secured at its opposite ends to rollers 30, 31, passing between plates 10 and 11 through channel 14. The tape carries any suitable information, for instance, it may have a plurality of consecutively arranged charts 36, the individual charts having upon them the cost of different quantities of gasolene at a given price per gallon. Cover plate 11 is cut away at 37 to provide a sight opening which gives visibility to a portion of the tape where it extends between the rollers. The size of this opening is such that only one chart 36 is visible at a given time. Should the price of gasolene change, the proper roller 30 or 31 is rotated by its associated knob 35 to pass the tape in a manner to expose the proper chart through opening 37. Since, as a matter of economy and simplicity, there are provided no frictional retards on the rollers to prevent the development of slack in the tape and to keep said tape from bulging outwardly through opening 37, I provide in a very simple and effective manner, means between said rollers and adjacent sight opening 37 for imposing a frictional drag on the tape, thus tending to keep the tape flatly against plate 10 where it traverses the sight opening. I provide for this purpose a marginal flange 38 on plate 11 about opening 37, said flange being bent slightly inwardly or toward plate 10 and preferably being reinforced by turning the metal inwardly upon itself, as at 39. This provides, in effect, a defining bead about opening 37 on the under face of the cover plate and serves not only to press the tape against the supporting plate but also to strengthen and reinforce the cover plate where it has been pierced to provide the opening.

The drag thus imposed on the tape prevents over-run of the free roller, that is, assuming the upper roller be manually rotated, roller 31 may be considered as a free roller, and, in the absence of bead 39, were the upper roller to be given a quick turn, roller 31 would be driven by the tape in a manner tending to spin it and thus cause it to overrun in a manner to develop slackness in the tape, an obviously undesirable feature.

In Fig. 7 I have indicated a device generally similar to Fig. 1, except that here are shown a plurality of sight openings 37' and tape 16' carries a series of month calendars 36'. By actuation of one or the other of knobs 35', tape 16' may be shifted in a manner to expose a different series of months, the utility of this feature being self-evident.

It will be understood the drawings and description are to be considered merely as illustrative of and not restrictive on the broader claims appended hereto, for various changes in design, structure and arrangement may be made without departing from the spirit and scope of said claims.

I claim:

1. In an article of the character described, a supporting plate, a cover plate adapted to be slid to and from a position overlapping the supporting plate, a pair of spaced, axially parallel rollers mounted on the cover plate, a data-carrying tape applied at its opposite ends to the rollers and extending along the underside of the cover plate, means whereby one of said rollers is adapted to be revolved to wind the tape thereonto from the other roller; there being a sight opening in the cover plate between the rollers and giving visibility to a portion of the data tape where it extends between said rollers.

2. In an article of the character described, a supporting plate and a cover plate adapted to be slid relatively to and from mutually overlapping positions, said plates being spaced apart intermediate their side edges to provide a channel therebetween, a pair of spaced, axially parallel rollers mounted on the cover plate at opposite ends of the channel, a data-carrying tape applied at its opposite ends to the rollers and extending through the channel, and means whereby the rollers are adapted to be revolved; there being a sight opening in the cover plate between the rollers and giving visibility to a portion of the data tape where it extends through the channel.

In witness that I claim the foregoing I have hereunto subscribed my name this 24th day of February, 1927.

ELTON ISBELL.